US011809626B2

(12) United States Patent
Liddell et al.

(10) Patent No.: US 11,809,626 B2
(45) Date of Patent: Nov. 7, 2023

(54) TECHNIQUES FOR IDENTIFYING USER INTERFACE ELEMENTS AND SYSTEMS AND DEVICES USING THE SAME

(71) Applicant: Atmel Corporation, Chandler, AZ (US)

(72) Inventors: William Liddell, Petersfield (GB); Paul Clements, Meonstoke (GB); Thomas Souche, Munich (DE)

(73) Assignee: Atmel Corporation, Chandler, AZ (US)

( * ) Notice: Subject to any disclaimer, the term of this patent is extended or adjusted under 35 U.S.C. 154(b) by 0 days.

(21) Appl. No.: 16/752,471

(22) Filed: Jan. 24, 2020

(65) Prior Publication Data
US 2020/0159332 A1 May 21, 2020

Related U.S. Application Data

(62) Division of application No. 15/983,750, filed on May 18, 2018, now Pat. No. 11,157,083.

(60) Provisional application No. 62/507,902, filed on May 18, 2017.

(51) Int. Cl.
*G06F 3/01* (2006.01)
*G06F 9/451* (2018.01)
*G06F 3/041* (2006.01)
*G06F 3/0488* (2022.01)
*G06F 40/221* (2020.01)

(52) U.S. Cl.
CPC ............ *G06F 3/016* (2013.01); *G06F 3/0416* (2013.01); *G06F 3/0488* (2013.01); *G06F 9/451* (2018.02); *G06F 40/221* (2020.01); *G06F 2203/014* (2013.01)

(58) Field of Classification Search
None
See application file for complete search history.

(56) References Cited

U.S. PATENT DOCUMENTS

| | | | |
|---|---|---|---|
| 2002/0075327 A1* | 6/2002 | Stall | G06F 9/451 |
| | | | 715/853 |
| 2004/0090458 A1 | 5/2004 | Yu et al. | |
| 2005/0050016 A1 | 3/2005 | Stanoi et al. | |
| 2005/0149503 A1* | 7/2005 | Raghavachari | G06F 16/83 |
| 2010/0192167 A1 | 7/2010 | Feies | |

(Continued)

FOREIGN PATENT DOCUMENTS

| | | |
|---|---|---|
| CN | 104115107 A | 10/2014 |
| CN | 105425959 A | 3/2016 |

(Continued)

OTHER PUBLICATIONS

S. Lloyd and M. Gokhale, "In-Memory Data Rearrangement for Irregular, Data-Intensive Computing," in Computer, vol. 48, No. 8, pp. 18-25, Aug. 2015, doi: 10.1109/MC.2015.230. (Year: 2015).*

(Continued)

*Primary Examiner* — Frank D Mills
(74) *Attorney, Agent, or Firm* — TraskBritt

(57) ABSTRACT

The embodiments of the present disclosure relate generally to techniques for identifying elements in a user interface (UI), and more particularly, techniques for determining UI elements selected on a contact-sensitive user interface and using those techniques to provide one or more haptic responses.

19 Claims, 13 Drawing Sheets
(5 of 13 Drawing Sheet(s) Filed in Color)

(56) References Cited

U.S. PATENT DOCUMENTS

| | | | |
|---|---|---|---|
| 2010/0198698 A1 | 8/2010 | Raleigh et al. | |
| 2011/0099498 A1 | 4/2011 | Barkol et al. | |
| 2012/0131556 A1* | 5/2012 | Mathur | G06F 11/3668 717/125 |
| 2014/0331120 A1 | 11/2014 | Boyer | |
| 2014/0344741 A1 | 11/2014 | Newman | |
| 2015/0220216 A1 | 8/2015 | Wigdor et al. | |
| 2016/0188183 A1* | 6/2016 | Soffer | G06F 3/0481 715/762 |
| 2016/0195932 A1* | 7/2016 | Czelnik | G06F 3/04886 715/702 |
| 2017/0192942 A1* | 7/2017 | Craik | G06F 40/137 |
| 2018/0348865 A1* | 12/2018 | Czelnik | B60K 37/06 |

FOREIGN PATENT DOCUMENTS

| | | | |
|---|---|---|---|
| CN | 106164839 A | 11/2016 | |
| JP | 2013-003597 A | 1/2013 | |
| JP | 2016-521891 A | 7/2016 | |
| KR | 10-2012-0124445 A | 11/2012 | |
| KR | 10-2014-0077697 A | 6/2014 | |
| KR | 10-2014-0106996 A | 9/2014 | |
| TW | 201502823 A | 1/2015 | |
| TW | 201629743 A | 8/2016 | |
| WO | 2016/057439 A1 | 4/2016 | |
| WO | WO-2016189017 A1 * | 12/2016 | B60K 37/06 |

OTHER PUBLICATIONS

ISA/206—Invitation to Pay Additional Fees Mailed on Aug. 10, 2018 for WO Application No. PCT/IB18/053535.

Nikola Mitrovic et al: "Adaptive User Interface for Mobile Devices" In: "Medical image computing and computer-assisted intervention—MICCAI 2015 : 18th international conference. Munich. Germany. Oct. 5-9, 2015; proceedings". Jan. 1, 2002 (Jan. 1, 2002). Springer International Publishing. Cham 032548. XP055496756. ISSN: 0302-9743 ISBN: 978-3-642-16065-3 vol. 2545. pp. 29-43. DOI: 10.1007/3-540-36235-5 3. p. 32-p. 40.

Outgoing—ISA/210—International Search Report dated Oct. 5, 2018 for WO Application No. PCT/IB18/053535.

Taiwanese Search Report and Office Action for Taiwanese Application No. 107116844, dated Apr. 1, 2019, 27 pages with English Translation.

Written Opinion of the International Search Authority dated Oct. 5, 2018 for WO Application No. PCT/IB18/053535.

Lee, Kyungmin, Jason Flinn, Thomas J. Giuli, Brian Noble, and Christopher Peplin. "Amc: Verifying user interface properties for vehicular applications." In Proceeding of the 11th annual international conference on Mobile systems, applications, and services, pp. 1-12.2013. (Year: 2013).

International Search Report and Written Opinion received for PCT Patent Application No. PCT/IB2018/053535, dated Oct. 5, 2018, 15 pages.

John, Daintith, and Wright Edmund. "Oxford Dictionary of Computing." (2008), p. 284; 527. (Year: 2008).

Korean Office Action from Korean Application No. 10-2019-7035830, dated Nov. 16, 2020, 10 pages.

Nikola Mitrovic et al: "Adaptive User Interface for Mobile Devices" In: "Medical image computing-assisted intervention-MICCAI 2015: 18th international conference, Munich, Germany, Oct. 5-9, 2015; proceedings", Jan. 1, 2002 (Jan. 1, 2002), Springer International Publishing, Cham 032549, XP055496756, ISBN: 978-3-642-16065-3 vol. 2545, pp. 29-43, DOI: 10.1007/3-540-36235-5_3, p. 32.-p. 40.

Korean Preliminary Rejection from Korean Application No. 10-2021-7033478, dated Jan. 3, 2022, 7 pages.

Japanese Notice of Reasons for Refusal for Japanese Application No. 2019-563413, dated Jul. 5, 2022, 8 pages with English translation.

Korean Notice of Reasons for Rejection for Korean Application No. 10-2021-7033478, dated Aug. 29, 2022, 9 pages with English translation., dated Aug. 29, 2022.

Chinese First Office Action for Chinese Application No. 201880031904.7, dated Nov. 18, 2022, 14 pages with translation.

Japanese Decision of Refusal for Japanese Application No. 2019-563413, dated Oct. 13, 2022, 4 pages with English translation.

Korean Notice of Final Rejection for Korean Application No. 10-2021-7033478, dated Mar. 2, 2023, 6 pages with English translation., dated Mar. 2, 2023.

* cited by examiner

TECHNIQUES FOR IDENTIFYING USER INTERFACE ELEMENTS AND SYSTEMS AND DEVICES USING THE SAME

CROSS-REFERENCE TO RELATED APPLICATION

This application is a divisional of U.S. patent application Ser. No. 15/983,750, filed May 18, 2018, now U.S. Pat. No. 11,127,083, issued Oct. 26, 2021, which claims the benefit under 35 U.S.C. § 119(e) of U.S. Provisional Patent Application Ser. No. 62/507,902, filed May 18, 2017 the disclosure of each of each of which is hereby incorporated herein in its entirety by this reference.

TECHNICAL FIELD

The embodiments of the present disclosure relate generally to techniques for identifying elements in a user interface (UI), and more particularly, techniques for determining UI elements selected on a contact-sensitive user interface and using those techniques to provide one or more haptic responses.

BACKGROUND

Touch interfaces that incorporate touch sensing are used for a variety of applications, including for example in tablet computers, personal computers, smart phones, and other consumer products. They are also used as control panels for automobiles, appliances (e.g., refrigerators, ovens, washers/dryers, etc.) heating and air-conditioning control systems, security systems, and automatic teller machines (ATMs). A touch interface in these applications may be e.g., a touch-pad or may incorporate a screen and a graphical user interface (GUI).

Generally, there is a need for touch interfaces that have sufficient responsiveness and accuracy to be used with many applications.

BRIEF DESCRIPTION OF THE DRAWINGS

The purpose and advantages of the embodiments of the present disclosure will be apparent to one of skill in the art from the detailed description in conjunction with the following accompanying drawings. The patent or application file contains at least one drawing executed in color. Copies of this patent or patent application publication with color drawing(s) will be provided by the Office upon request and payment of the necessary fee.

BRIEF SUMMARY

Figure 1:
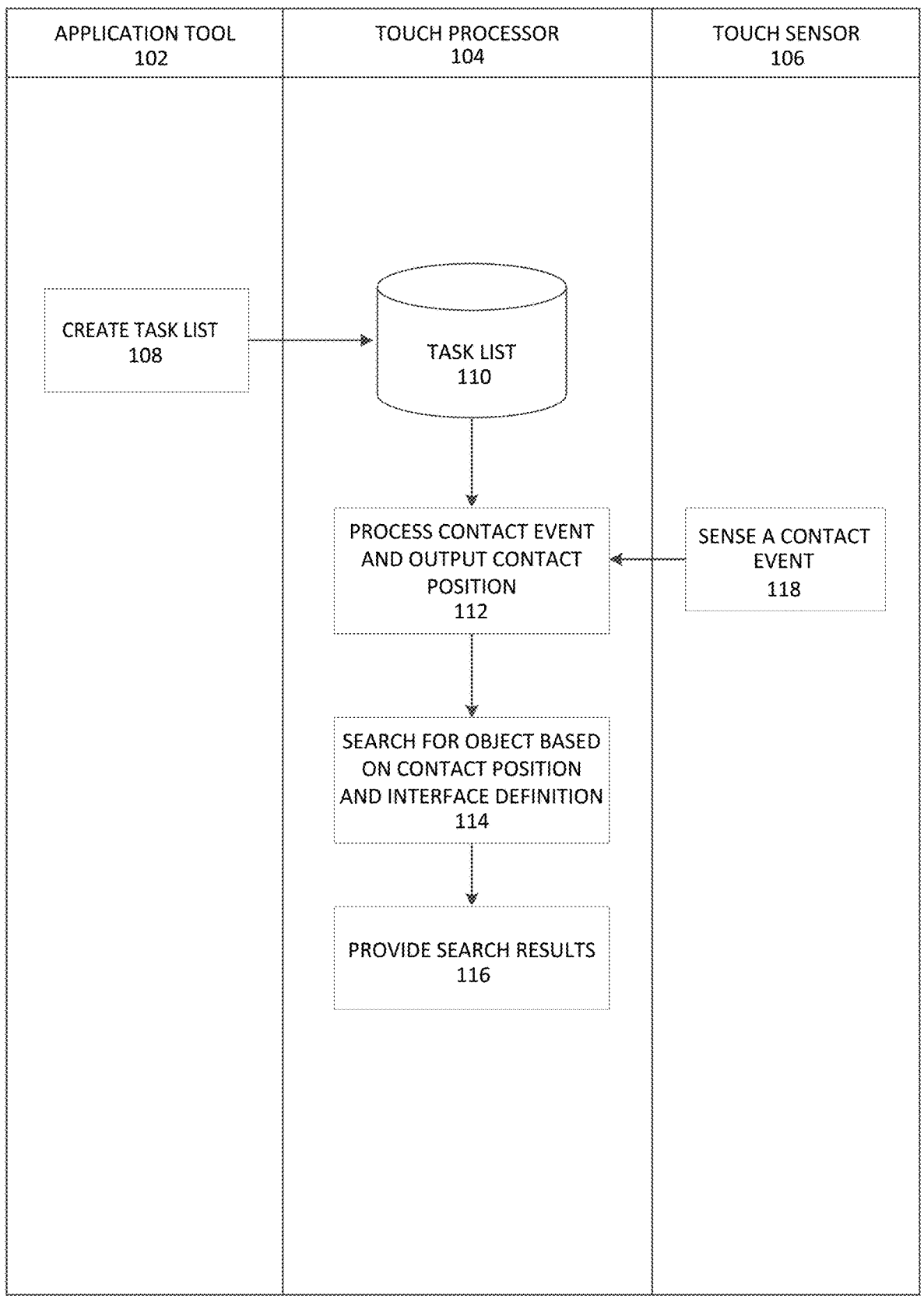
FIG. 1 is a swim-diagram illustrating the process of generating and using a search task list to identify contacted UI elements in a GUI.

Some embodiments of the disclosure relate, generally, to a method of creating instructions for searching for an element of a graphical user interface (GUI) displayed on a contact sensitive screen. The method includes parsing a GUI definition and identifying elements of the GUI responsive to the parsing; creating a record comprising entries of identified elements; associating the identified elements with groups of similarly located elements; arranging the record of identified elements into a tree-like structure; collapsing identified elements in same groups into a single leaf in the tree-like structure; optimizing the tree-like structure; and creating a search instructions list responsive to the tree-like structure.

Some embodiments of the disclosure relate, generally, to a computer program product for enabling a computer to create executable instructions to search for an element of a graphical user interface (GUI). The program product may include a computer readable medium and software instructions on the computer readable medium. The software instructions on the computer readable medium adapted to enable the computer to perform the operations of: parsing a GUI definition and identifying elements of the GUI responsive to the parsed GUI definition; creating a record comprising entries of the identified elements; associating the identified elements with groups of similarly located elements; arranging the record of identified elements into a tree-like structure; collapsing identified elements in same groups into a single leaf in the tree-like structure; optimizing the tree-like structure; and creating a list of search instructions responsive to the tree-like structure.

Some embodiments of the disclosure relate, generally, to a microcontroller operably coupled to a touch screen configured to display a graphical user interface (GUI). The microcontroller includes at least one processor and one or more executable instructions stored on a non-transitory storage medium. The instructions, when executed by the processor, are adapted to enable the processor to: determine a location of a sensed touch at a touch screen; and identify a GUI element associated with the location of touch corresponding to the sensed touch.

Some embodiments of the disclosure relate, generally, to a method of identifying an element of a graphical-user-interface (GUI) displayed at a touch screen. The method includes determining a location of a sensed touch at a touch screen; executing one or more search instructions responsive to the location, wherein each search instruction of the one or more search instructions corresponds to a GUI element, and, when executed, is adapted to return a search result; and identifying a GUI element responsive to the search result.

Some embodiments of the disclosure relate, generally, to a system. The system includes a display sub-system and a touch sub-system. The display sub-system is configured to control a display. The touch sub-system includes a touch sensor and a touch controller. The touch controller is configured to determine a location of a sensed touch at the touch sensor; execute one or more search instructions responsive to the location and a search tree, wherein each search instruction of the one or more search instructions corresponds to a GUI element, and, when executed, is adapted to return a search result; identify a GUI element responsive to the search result; and generate a haptic control message responsive to the identified GUI element.

DETAILED DESCRIPTION

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure. The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

It will be readily understood that the components of the embodiments as generally described herein and illustrated in the drawings could be arranged and designed in a wide variety of different configurations. Thus, the following description of various embodiments is not intended to limit the scope of the present disclosure, but is merely representative of various embodiments. While the various aspects of the embodiments may be presented in drawings, the drawings are not necessarily drawn to scale unless specifically indicated.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, symbols, and chips that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general-purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

The various embodiments described in this disclosure relate, generally, to techniques for determining UI elements selected on a contact-sensitive user interface and using those techniques to provide one or more haptic responses. As understood for purposes of the embodiments described herein, a contact sensor may respond to an object's (such as a finger or a stylus) contact with, or the object's proximity to, a contact-sensitive area of a touch interface. In this disclosure "contact" generally refers to an object's physical contact with a contact-sensitive area, but it may also encompass the close proximity of an object that produces a measureable response by the contact sensor. Further, a contact-sensitive area refers to the physical area on a touch interface where a contact sensor may respond to an object's contact.

A contact-sensitive GUI as used herein refers to a touch interface integrated with a GUI. For example, a GUI typically includes one or more display regions and active/activatable regions. In this disclosure, a display region is a region of a user interface which displays information to the user. An activatable region is a region of a GUI, such as a button, slider, or a menu, which allows the user to take some action with respect to the user interface. Some display regions are also activatable regions in that they display information and some action may be taken. In a contact-sensitive GUI, contacting a touch-sensitive area on which an active region is displayed may activate that region (e.g., tapping a GUI button on a touch screen). Active regions may be displayed as GUI elements/objects, for example, buttons, sliders, selectable panes, menus, etc., all of various shapes and sizes.

Generally, if contact is sensed at a contact sensitive area, a process is used to determine the active regions of the GUI to which the contact corresponds, if any. For example, if an "ENTER" button is tapped, the contact is measured and responsive to the measured contact a process determines that the contact was at the ENTER button. The ENTER button is an active region so events are created in the touch sensitive GUI and/or the underlying application program that invoked the GUI.

Further, if a particular GUI element is associated with the active region, actuators integrated with the touch interface may provide one or more physical responses, commonly referred to as haptic responses. These may be in the form of forces, vibrations, or movements and may mimic surface textures, ridges, edges, interactions like pushing/clicking a button, as well as other simulated sensations and responses. In the case of a GUI, the haptic response may be localized to the GUI element with which a user interacts. For example, if a user touches a GUI button the haptic response may make the button feel raised with an edge, as if it were depressed, or like it has a rough texture.

The various embodiments described herein may sometimes refer to creating and updating electronic records. The electronic records may be in the form of a data file, and updating an electronic record may include inserting or deleting data entries in one or more fields of the record. Alternatively, at runtime, it may refer to a class object and instantiated objects having state information and variables consistent with the described record. Both situations are contemplated in the various embodiments described herein.

The various embodiments of this disclosure relate to techniques for identifying those GUI elements that have been contacted on a contact sensitive interface. These techniques and associated structures are particularly efficient in terms of memory use and responsiveness. Further, the interface data storage requirements are small, and the number of tasks performed at execution time to identify a UI element are few, as compared to other techniques.

Some embodiments of the disclosure relate to a process for creating a list of optimized search tasks that may be performed to identify the GUI elements that were contacted on the contact sensitive interface. The search tasks may be processor executable instructions that, when executed, return a success or failure message to the sub-system that is searching for the element of the GUI that was contacted, if any. In one embodiment, the search tasks are created based on a definition file that maps out the various elements and their locations in a GUI. The search task is optimized for various efficiency parameters.

In one embodiment, the search task list may be executed by an embedded device, for example, a touch controller as compared to conventional contact sensitive GUIs known to the inventors of this disclosure that may perform the search in a display sub-system (e.g., an automotive head-unit). Performing a search for a GUI element in a touch controller saves time communicating with the display sub-system and time for the sub-system to respond and communicate with, for example, a haptic feedback sub-system. The saved time improves the responsiveness of contact-sensitive GUIs as compared to the conventional contact-sensitive GUIs, and from a user's perspective, shortening the time from when he/she touches a screen to when they receive feedback responsive to the touch.

Moreover, creation of the task search list is configurable, and, depending on the GUI, sets of common features may be selected for an implementation that are optimized for the specific application. For example, in some embodiments the creation process may be optimized for a GUI that includes paging, drop down menus and pop-up windows that obscure other GUI elements, elements of certain shapes, or elements that move or deform when they are contacted.

FIG. 1 illustrates an overall operation of a system according to various embodiments of the disclosure. In operation 112, a software application tool 102 is configured to process a UI definition file to create a search task list (operation 108) of conditioned executable instructions that may be performed to identify a UI element, if any, that has been contacted on a contact sensitive screen.

The search task list may be stored (operation 110) in a non-transitory storage memory that is accessible by one or more processors that are part of a touch system. When a contact event occurs at a touch interface, a touch sensor 106 may sense the touch (operation 118) and provide one or more signals indicative of the touch to the touch processors. The touch processors 104 determine (operation 112) a location on the touch interface where the contact occurred and responsive to that determination search (operation 114) for and identify a UI element, if any, which was contacted. In one embodiment, the touch processor 104 may provide (operation 116) the search results to a graphical user interface sub-system.

An embodiment of a process to create a search task list will be described with reference to FIGS. 2, 3, 4, 5, 6, and 7. The embodiments of the disclosure utilize a search tree structure that organizes UI elements according to a tree and grid technique. The various UI elements are divided into related groups that are treated like grids, organized into a search tree, and then various search tasks are generated. The search tasks are conditioned to optimize execution of a search using the instructions. One of ordinary skill in the art will understand that other algorithms might be used to divide the screen(s) into searchable regions, for example, a divide and conquer method.

Figure 2:
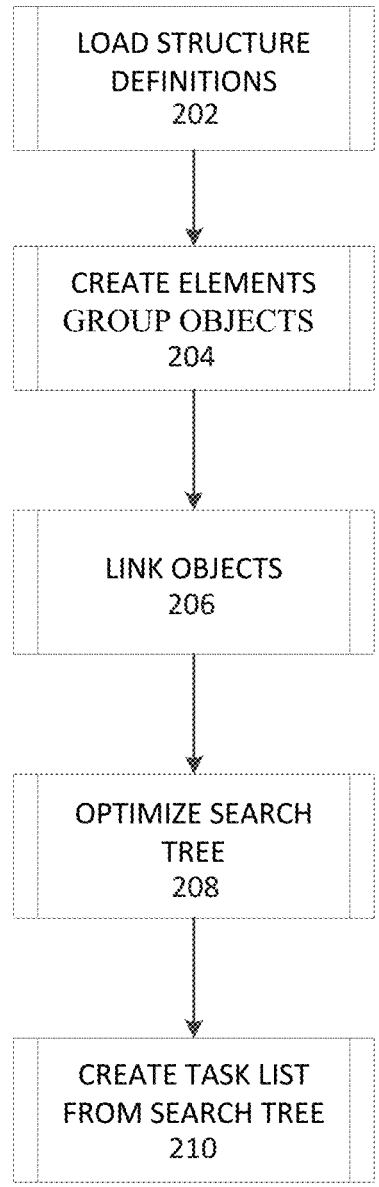
FIG. 2 is a flowchart of a process for generating a search task list according to an embodiment of the disclosure.

FIG. 2 illustrates an embodiment of a process of generating a search task list. In operation 202, a structure definition for the UI is loaded and parsed to identify screens, sub-screens, and UI elements on those screens and sub-screens. The UI structure definition may be an electronic file, a database, raw data, or the like. In operation 204, the elements are grouped and the searchable area is divided into one or more searchable regions having element groups. In operation 206, the groups are linked into a tree structure based on the searchable regions. In operation 208, search tasks are associated with the search tree branches and nodes to form a search tree, and the search tree is optimized. In operation 210, the conditioned tasks of the search tree are stored in a list, which is the task list that may be executed by a processor.

In one embodiment, the software application tool 102 that generates the search task list may be configured to write the results of one or more of operations 202, 204, 206, 208, and 210 to an output file. This may be used by a debugging tool to review the results of the process. The same debugging tool may be configured to use a textual version of a search task list and execute it within a virtual test environment (as, e.g., a .dos executable) to verify the search task list is operationally ready.

Figure 3:
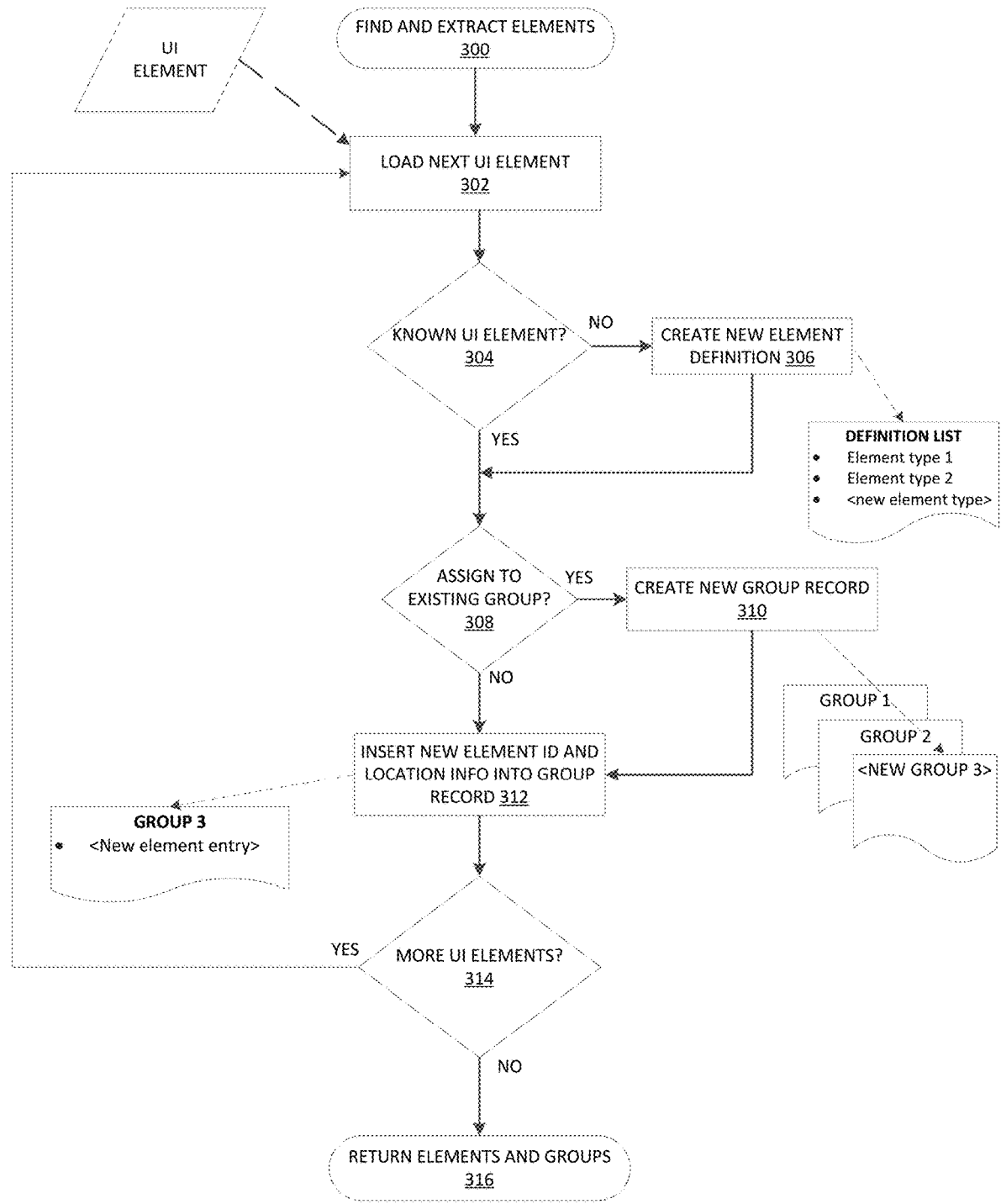
FIG. 3 is a flowchart of a process for extracting the UI elements from a UI structure definition according to an embodiment of the disclosure.

FIG. 3 illustrates an embodiment of a process 300 for extracting the UI elements from UI structure definitions. In one embodiment, the UI structure definition is an xml definition of the parts of a display that are to be converted by the configuration generation features of the application tool. The application tool parses the structure definitions and grabs the elements defined in the definition structure. In operation 302, each UI element is loaded and, in operation 304, a determination is made whether it is a known UI element. If it is not a known UI element (i.e., this is the first time this element has been identified in the structure definitions), then, in operation 306, the process creates a new element definition for that type of UI element (e.g., button, knob, slider, etc.). After creating the new definition, or if the element is a known UI element, then, in operation 308, a determination is made whether to assign the element to an existing group. In one embodiment, the determination whether to assign to an existing group is based on various pre-determined parameters, for example, common features of elements, such as the type of element, the screen where the UI element is displayed, a layer-position, a type of response associated with the element (e.g., visual, haptic, audio, etc.), and the like. If the decision is made to assign the element to a new group, then, in operation 310, a new group record is created with parameters related to the element. After a new group record is created, or if a determination is made to assign the element to an existing group, then, in operation 312, a new element entry is inserted into the group record for that new element. In one embodiment, the entry includes fields for the element ID and the location of the element (i.e., the coordinates of the element on the screen). In operation 314, a determination is made if there are more UI elements, and if there are more UI elements then the process is performed for each remaining UI element identified in the UI structure definition. In operation 316, the process returns the element(s), element definition(s), and group(s).

In an embodiment not illustrated in FIG. 3, if the UI structure definition includes more than one screen definition then each such screen is assigned a screen ID that is a parameter of the UI element. It may also be incorporated as parameter for each group. Each screen may also include sub-screens, which are defined areas of a displayed GUI where some UI elements dynamically change while UI elements outside those areas remain static. By way of non-limiting example, areas with dynamic elements may include swappable panes, scrollable menus, activatable information panes, navigation buttons, and the like.

Figure 4:
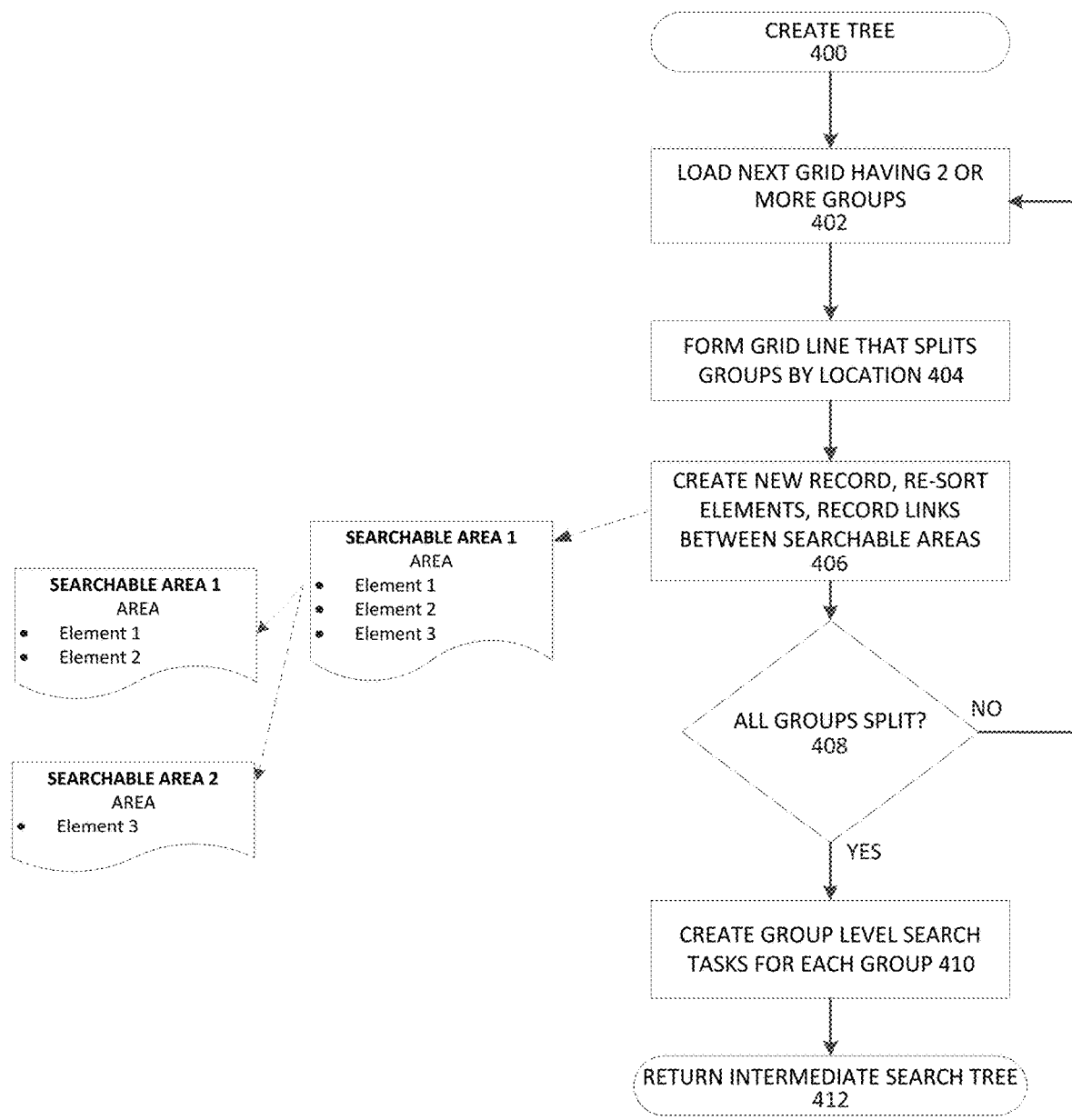
FIG. 4 is a flowchart of a process to generate an intermediate search tree according to an embodiment of the disclosure.

FIG. 4 illustrates a process 400 to create a search tree according to an embodiment of the disclosure. In this process, a determination is made about how to divide each screen identified in the UI definition into searchable areas, each searchable area including one or more groups of elements. In the embodiment of the process shown in FIG. 4, a dividing line (x-, y-coordinates) is selected that divides groups of elements such that at least one group is on one side of the dividing line and at least one other group on the other side of the dividing line. Effectively, the screen is now divided into two searchable regions with a shared boundary along the dividing line. The groups are divided in a recursive manner until the groups cannot be further divided.

In another embodiment, the screen or searchable areas are divided simultaneously in x- and y-coordinate directions, which may result in up to four subdivision of the groups. This technique could also result in fewer than four subdivisions, for example, three divisions of groups and one empty searchable region.

In yet other embodiments, circles, squares, and/or polygons may be used to define a portion of the screen to exclude from the searchable areas, such that it is not sub-divided into searchable areas.

Stepping through the process shown in FIG. 4, in operation 402 the first searchable area is loaded having two or more groups. For the first iteration, this should be the entire screen including all groups. In this embodiment, an initial searchable region record exists with an area defined to encompass the entire screen, including all elements and groups. In operation 404, a grid line is selected that divides the initial searchable region into two searchable regions each having some of the groups. In operation 406, a new record is created, the groups are sorted among the initial record and the new record, and the records are updated with their respective searchable areas. The dividing line is recorded as a split/division between the two searchable areas. The first searchable area and the groups and elements therein are linked to the division, which, in turn, is linked to the new searchable area and the groups and elements therein. At runtime, there will exist class objects of elements, class objects of groups, and class objects of splits/divisions.

For each searchable area containing more than one group of elements the process is recursively executed (operation 408) to divide the searchable areas.

Notably, in one embodiment, the elements are defined by a reference to an element definition (e.g., an element ID) and a move to an element's origin in this embodiment, the interface memory requirements are reduced because each element does not have to be individually defined.

Once a screen is fully divided, an intermediate search tree comprising divisions/splits, UI elements, and groups of UI elements, and links therebetween, now exists.

In operation 410, group level search tasks are created for each group. A group level task is a process step or series of process steps. The tasks may include: (i) tasks to determine if a touch or contact event occurred within a UI element (or without an element); (ii) tasks to modify the search region in some way; and (iii) tasks to set up for the next task.

Each group level task may include an indication of the next task to be performed in the event of success or failure. For example, each task may include a bit with an "offset" to the next task address. Further, each group level task may accept arguments when it is executed. In some embodiments, the previous task may provide the arguments or set an environmental bit/flag to indicate which arguments are available to the next task.

In one embodiment, the offset in the group coordinates (angle of position) may be used to generate an index. Every element in a searchable area may, if configured, be assigned a different ID that is offset by the index from the base ID of the searchable area. The result is an element ID and an offset value. Separate provisions exist for modifying either responsive (e.g., haptic) or element ID—so one group element might return a single element ID but multiple responsive IDs, and another might return one responsive ID for a number of different of elements.

The group level search tasks may be inserted into the group records, inserted into a search task list, or inserted into an intermediate record. Once the group level search tasks are completed, then in operation 412 the intermediate search tree is returned.

Though not illustrated in FIG. 4, in one embodiment environmental variables may be set for each task that indicates, if applicable, what will be returned if the task is performed, is a success, and is the final task. By way of non-limiting example, an environment variable may be a haptic ID and values to control how the element ID and haptic ID are modified for an element within a group shape, etc. Environmental flags may also be set which indicate the data to be sent to accompany the next task description. By using certain constraints and the correct environmental variables, a definition, for example, of a circle may be reduced from 7 to 2 bytes.

Figure 5:
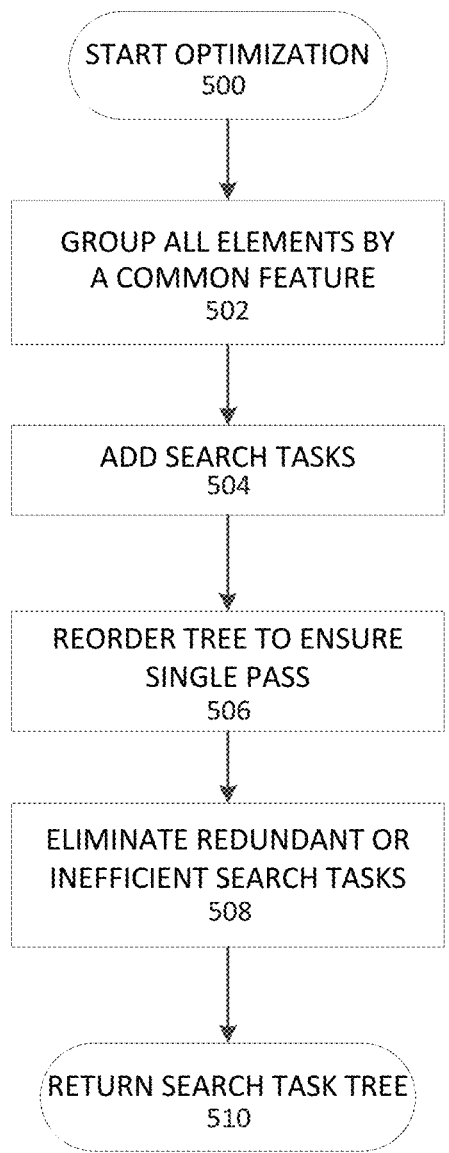
FIG. 5 is a flowchart of a process to generate a search task tree according to an embodiment of the disclosure.

FIG. 5 illustrates an embodiment of an optimization process 500 performed on the intermediate search tree. In operation 502, all elements are grouped by common features. Examples of common features include element type, position in a layer, position relative to another element in another layer (e.g., all behind the same element), a display group, shape, or more. In one embodiment, common features may be selected to optimize a search process. For example, if elements are grouped by layer-position with the elements on the top layer at the top of the search tree then those will be searched first. By way of another example, in an application where there is "paging" (i.e., layers of a user interface can be swiped to expose layers underneath or to pull a layer over another layer), grouping by display group allows control of all displayed elements using a single control, e.g., search for all elements in a display group, apply changes to those elements responsive to the control settings, turn on or off all elements in a display group, etc. In various embodiments, identifiers may be used to identify groups organized by common features, e.g., layer IDs, position IDs, shape IDs, etc.

In operation 504, search tasks are inserted into the search tree for each element and split to form an intermediate search task tree. In operation 506, the intermediate search task tree is re-ordered to ensure a single pass through for each task. In operation 508, redundant or inefficient search tasks are eliminated. In operation 510, the optimized search task tree is returned.

Figure 6:
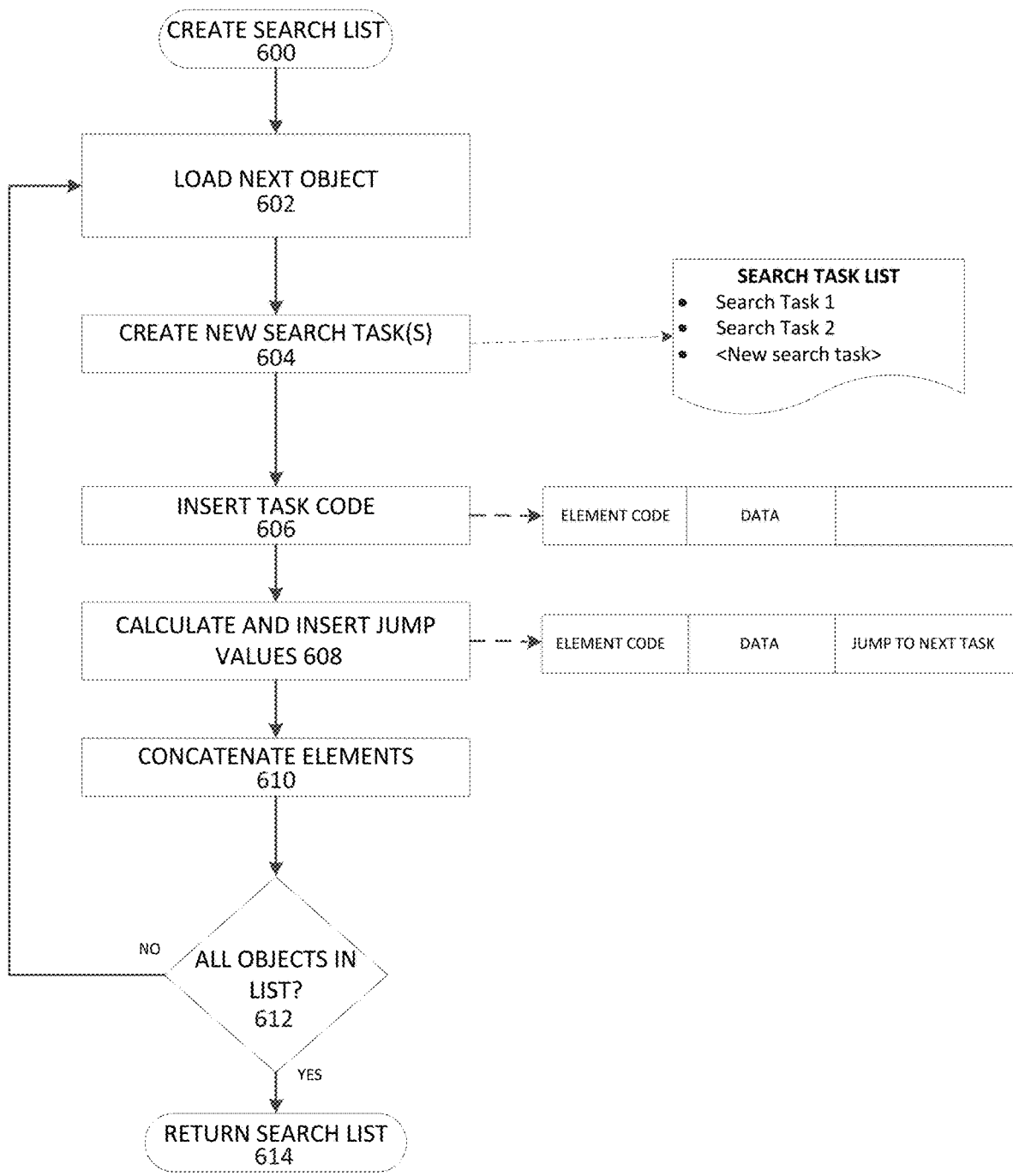
FIG. 6 is a flowchart of a process to generate a search task list according to an embodiment of the disclosure.

FIG. 6 illustrates an embodiment of a process 600 to create a search task list. In operation 602, the class objects in the search task tree are loaded and, in operation 604, instruction words (i.e., search tasks) are created from the class objects and the instruction words (i.e., search tasks) are inserted into a search task list. In the embodiment shown in FIG. 6, the instruction word includes a task code field and a jump field. In one embodiment, the instruction word includes a data field. Every failure (i.e., the element is different) and every split requires a jump to another instruction unless the next task immediately follows the current task in memory. In operation 606, the task codes are inserted into the task code field, and in operation 608 the jump values are inserted into the jump field.

In some embodiments some or all of the jump values are not inserted until all tasks are inserted into the search task list. In other embodiments, jump values may be inferred from the search task tree.

In operation 610, the various tasks of the search task list are concatenated in memory to form a conditioned search task list that, if all objects are in the list (operation 612), is returned by the process in operation 614. The search task list and search tree may be stored in memory.

The task instructions may vary by container size restrictions (i.e., byte restrictions) available in the particular environment in which the search task list will be implemented. In one embodiment, the data associated with each task instruction may vary depending on system requirements, including an instruction interface requirements (8-bit, 12-bit, 16-bit, etc.), available memory, etc. By way of non-limiting example, an instruction to search within an 8-sided polygon shaped UI element may be performed with just x- and y-coordinate data and the number of sides. However, additional data may be included to if the instruction interface and other memory requirements permit.

Figure 7:
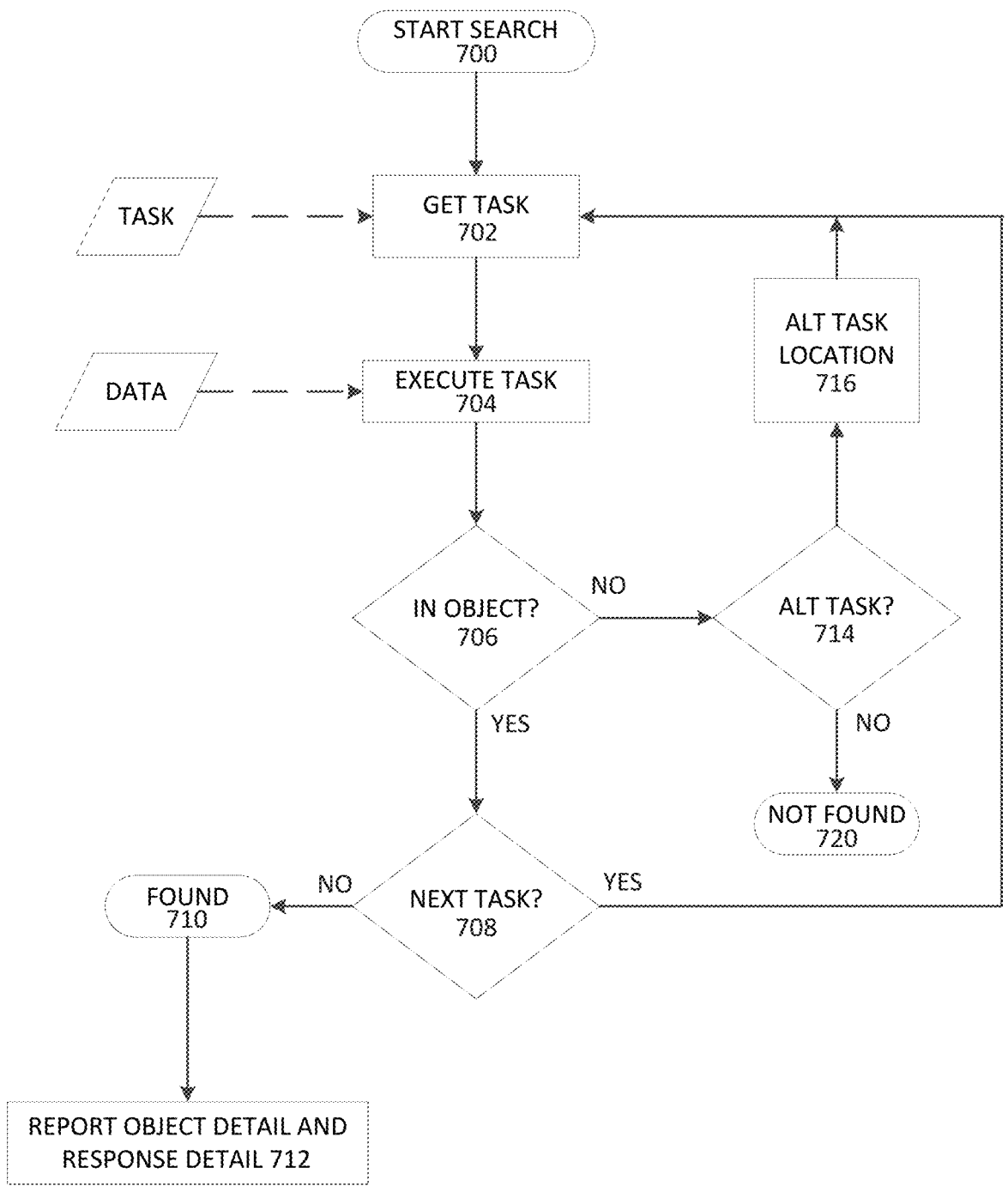
FIG. 7 is a flowchart of a process to determine if a touch occurred within a UI element, according to an embodiment of the disclosure.

FIG. 7 illustrates a search process 700 to determine if a touch occurred within a UI element, according to an embodiment of the disclosure. The search of the search tree is performed using provided data and the search task list. In operation 702, the executable instruction for each task is provided on the processor's interface sequentially with the payload data for each task, and executed in operation 704. As the search tree is searched, a determination is made in operation 706 if the touch occurred within a UI element, and the result of each task is a true/false, success/failure that indicates if the touch occurred within a UI element. In operation 708, the next task instruction and related data is loaded and received by the processor responsive to the result of the current task being a success. That is, if the result of operation 706 is a success then the next task in the task list is executed.

If the result is a failure then an alt task instruction and related data is loaded and received by the processor responsive to the result. If there is an alternate task (operation 714) then the alternate task location is supplied in operation 716 and the process loops back to operation 702, and the tasks is loaded from the alternate location for the processor. When the search is exhausted the UI element is either found or not found. If the UI element is found then a found result is returned in operation 710, and in operation 712, the ID for that element is returned as well any environmental settings/responsiveness parameters. If the operation is not found, then a not found result is returned in operation 720.

In one embodiment, the search process shown in FIG. 7 may be a firmware application executing at a touch processor (microcontroller). The touch processor may have the one or more search tasks that are executed by the search process stored in a flash memory. In one embodiment, search tasks may be stored at a RAM associated with a display controller, and the search tasks may be provided to touch processor during a setup or provisioning process and kept accessible to the search process.

It is now understood by the inventors that the described embodiments offer several advantages over alternative approaches. The memory requirements are significantly reduced—up to 50% from linear search, pure grid method or pure search tree method; and still an improvement over combination grid/tree methods. This is in part because the number of search operations performed is reduced. Because the number of search operations is reduced, the response cycles are significantly shorter than alternative approaches (which includes conventional approaches). For example, on a 1200×1200 contact sensitive GUI, cycle times of less than 36 μs were achieved, compared to alternative approaches that ranged from 72 μs (pure grid) to 1200 μs (linear). For a user, the difference is a much more responsive touch interface. For a designer, the touch interface may be more sophisticated having many elements with different response characteristics.

Figure 8:
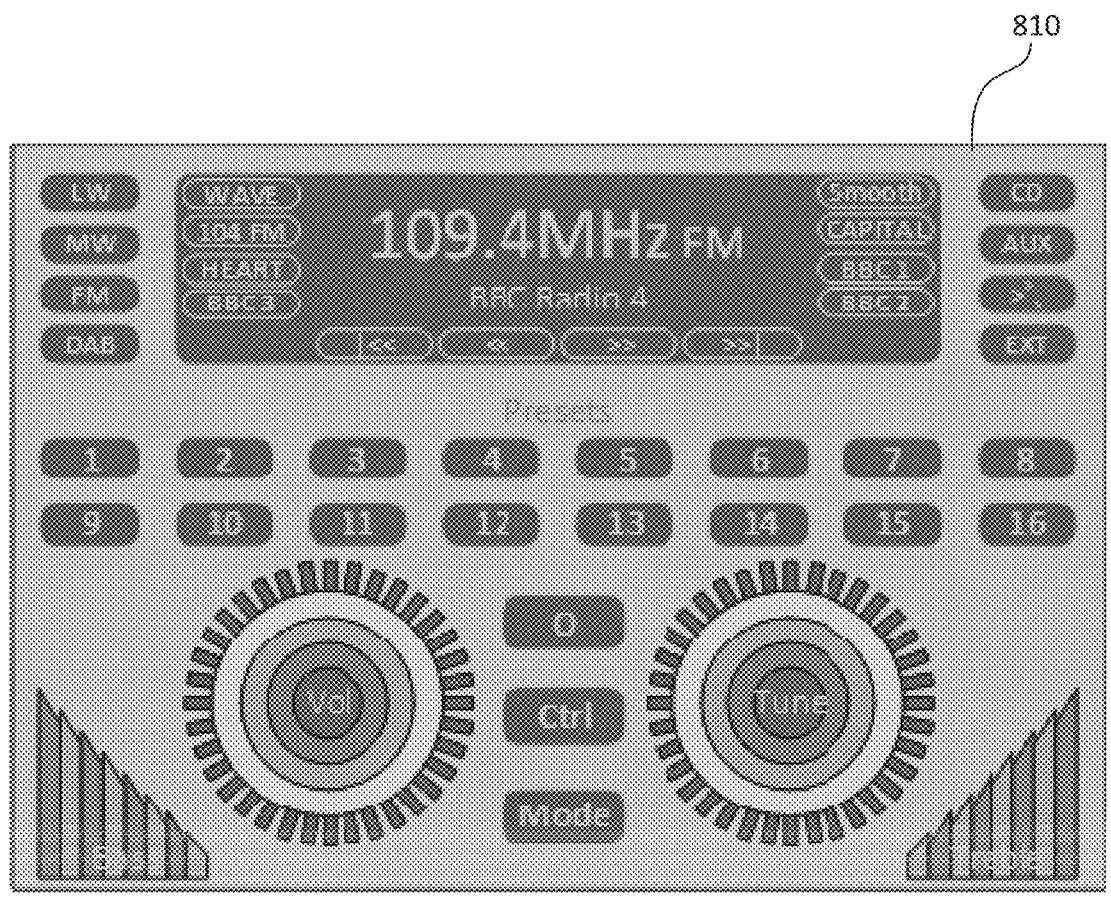
FIG. 8 shows an embodiment of a radio GUI comprised of UI elements.
Figure 9:
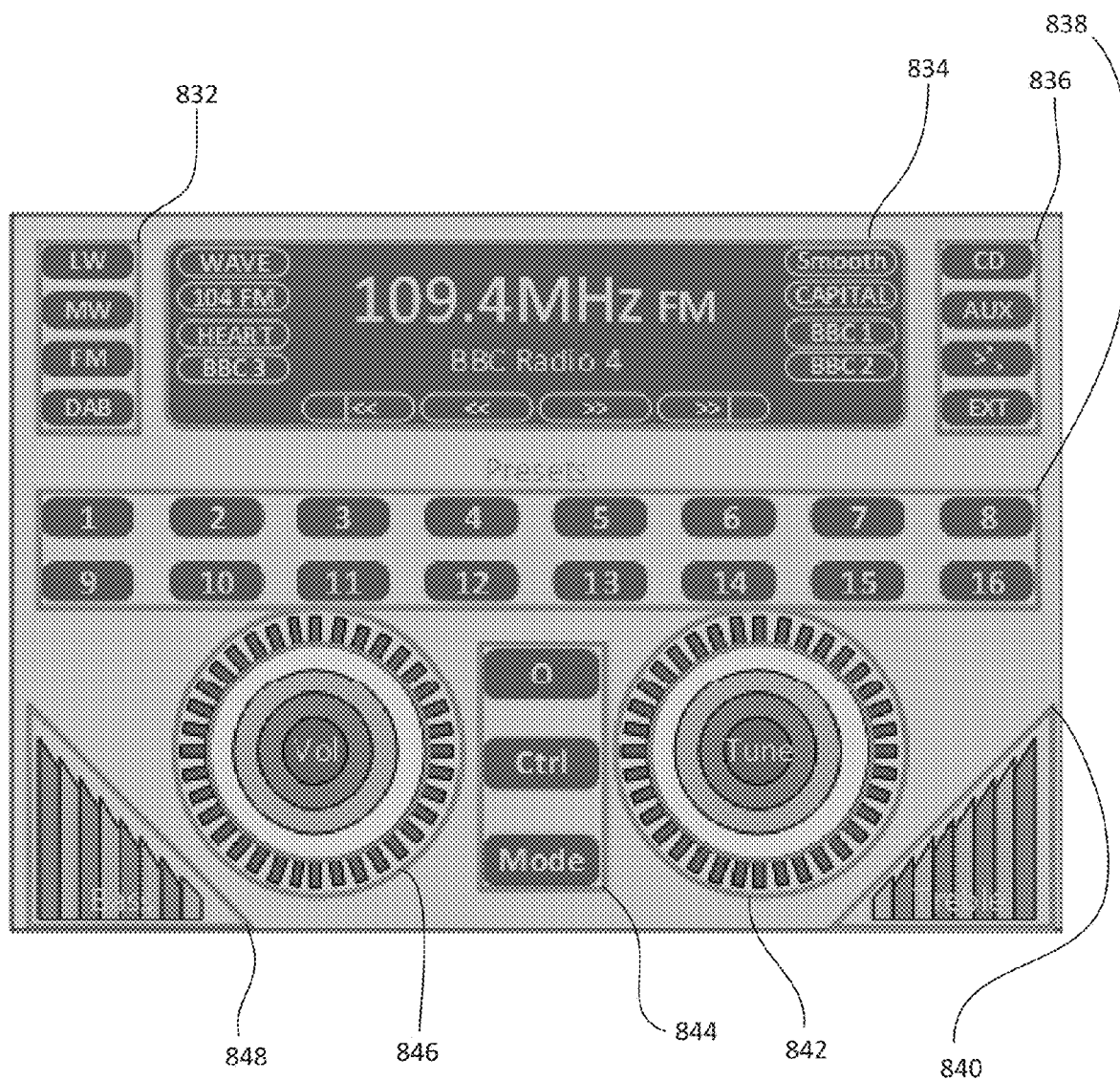
FIG. 9 shows the UI elements of the radio GUI of FIG. 8 grouped according to embodiments of the disclosure.
Figure 10:
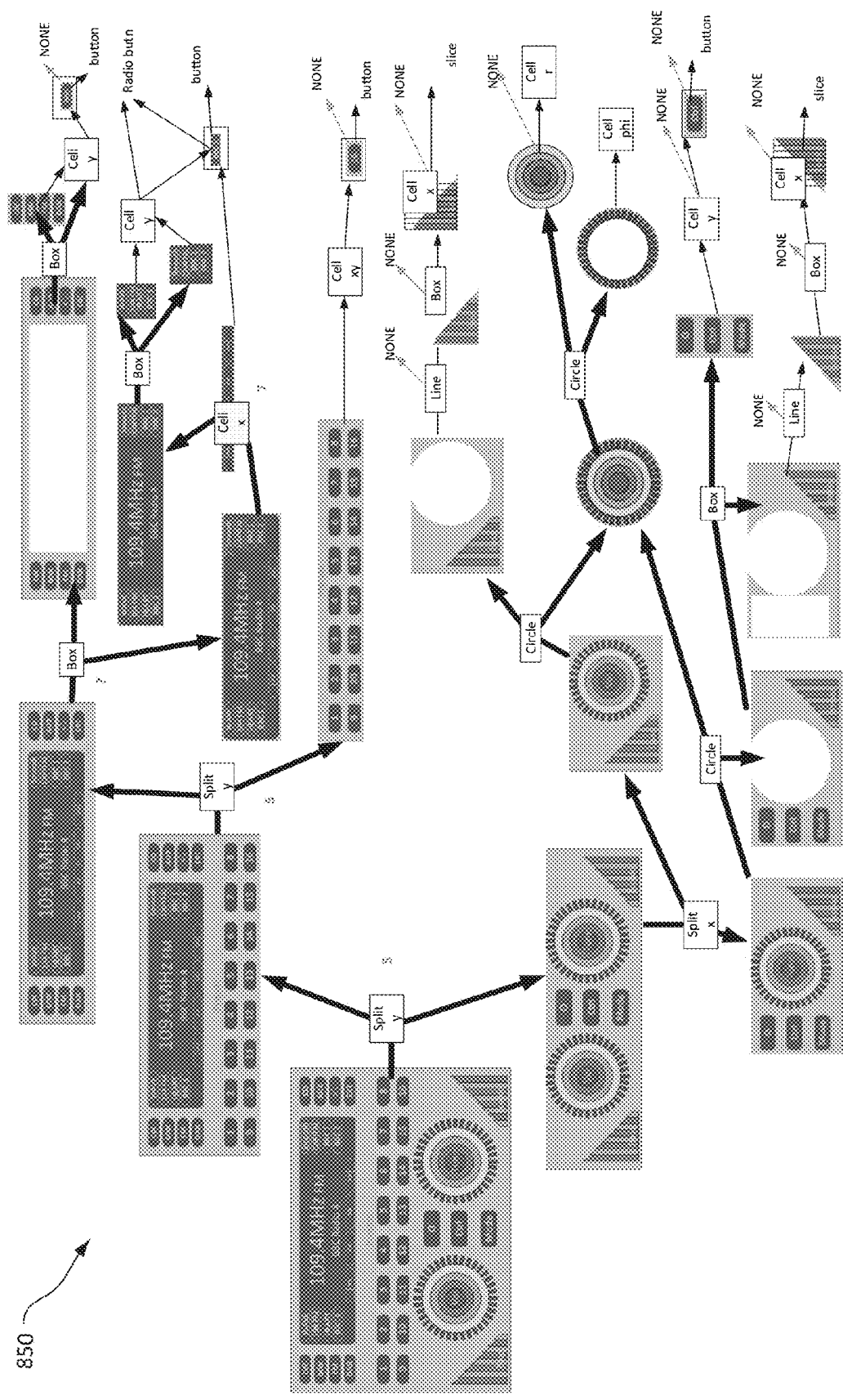
FIG. 10 shows UI elements in a tree-structure formed according to embodiments of the disclosure.

FIGS. 8, 9 and 10 illustrate processes illustrated and described with reference to FIGS. 2 through 7, in connection with a GUI for a radio application as one non-limiting example of a GUI that can be used with embodiments of the disclosure. The radio GUI 810 illustrated in FIG. 8 includes eight types of UI elements and a total of 144 UI elements, summarized in table 820.

FIG. 9 shows UI elements grouped according to the methods described with reference to FIG. 3. In this embodiment, the grouped elements 832, 834, 836, 838, 840, 842, 844, 846, and 848 have similar touch characteristics (e.g., haptic feedback responsive to a touch), physical locations on the screen, and shapes.

FIG. 10 shows an example of a tree structures 850 formed using the tree and grid method described with reference to FIG. 4.

Figure 11:
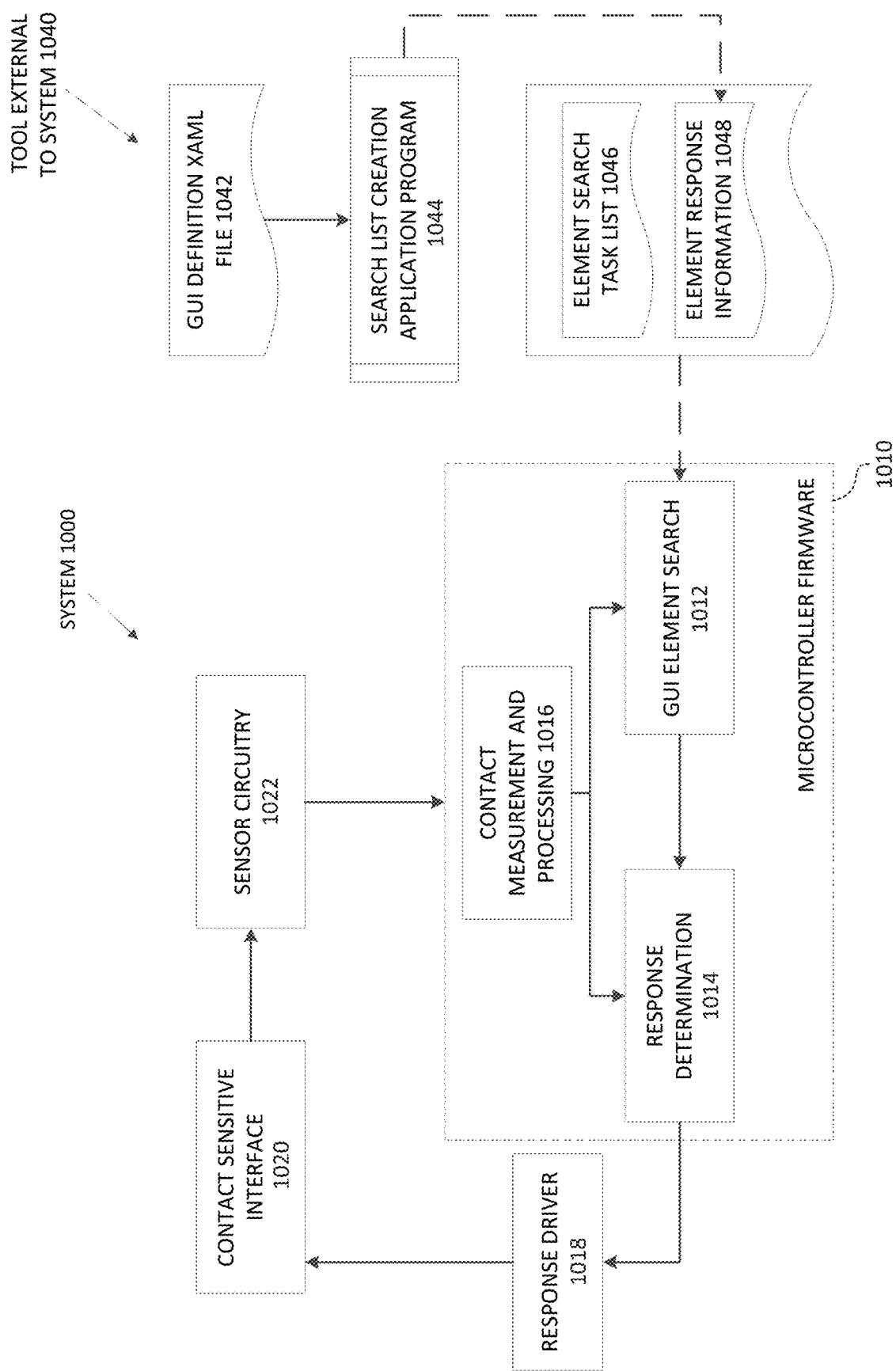
FIG. 11 shows an embodiment of a system incorporating search task lists.

FIG. 11 illustrates a system 1000 and related tool 1040 that may implement the searching methods described herein according to an embodiment of the disclosure. The system 1000 includes microcontroller firmware 1010 having thereon a GUI element searching functions 1012 and response determination 1014 for GUI elements. The processor executing the microcontroller firmware 1010 is coupled to a response driver 1018 that can receive control signals from the microcontroller firmware 1010 and in turn drive a response in a contact sensitive interface 1020. In one embodiment, the contact sensitive interface 1020 is a touch screen including one or more actuators, and the response driver 1018 is a haptic driver configured to generate control signals that will excite the actuators. Sensor circuitry 1022 may generate one or more measurement signals responsive to contact at the contact sensitive interface 1020. The contact measurement and processing 1016 may determine contact information (e.g., location, type, etc.) and provide it to the response determination 1014 and GUI element searching functions 1012 responsive to the measurement signals from the sensor circuitry 1022. The control signals received at the response driver 1018 may be based on, at least in part, the contact information, for example, so that haptic feedback is provided at the right location on the contact sensitive interface 1020.

Also shown in FIG. 11 is a tool 1040 that may implement a search list creation process and create an element search task list and element response information, according to an embodiment of the disclosure. A search list creation application program 1044 is configured to implement the processes described with reference to FIGS. 2 through 6 a GUI definition XAML file 1042 to generate an element search task list. The search list creation application program 1044 may provide the element search task list 1046 and element response information 1048 as a file to the microcontroller firmware 1010. In one embodiment, it may also provide a search tree, although that may be incorporated into the search tasks.

In one or more embodiments of the firmware, the firmware may include force measurement and processing functions to incorporate force level information about a touch event. In those embodiments, the force level information and the GUI element ID and haptic response details returned by the element search function may be used by a haptic sequencer to generate haptic control signals responsive to the force level, GUI element ID and haptic response details.

The system of FIG. 11 may be incorporated into various consumer products, appliances and machinery that utilize touch interfaces and touch control panels, including automobiles.

Figure 12:
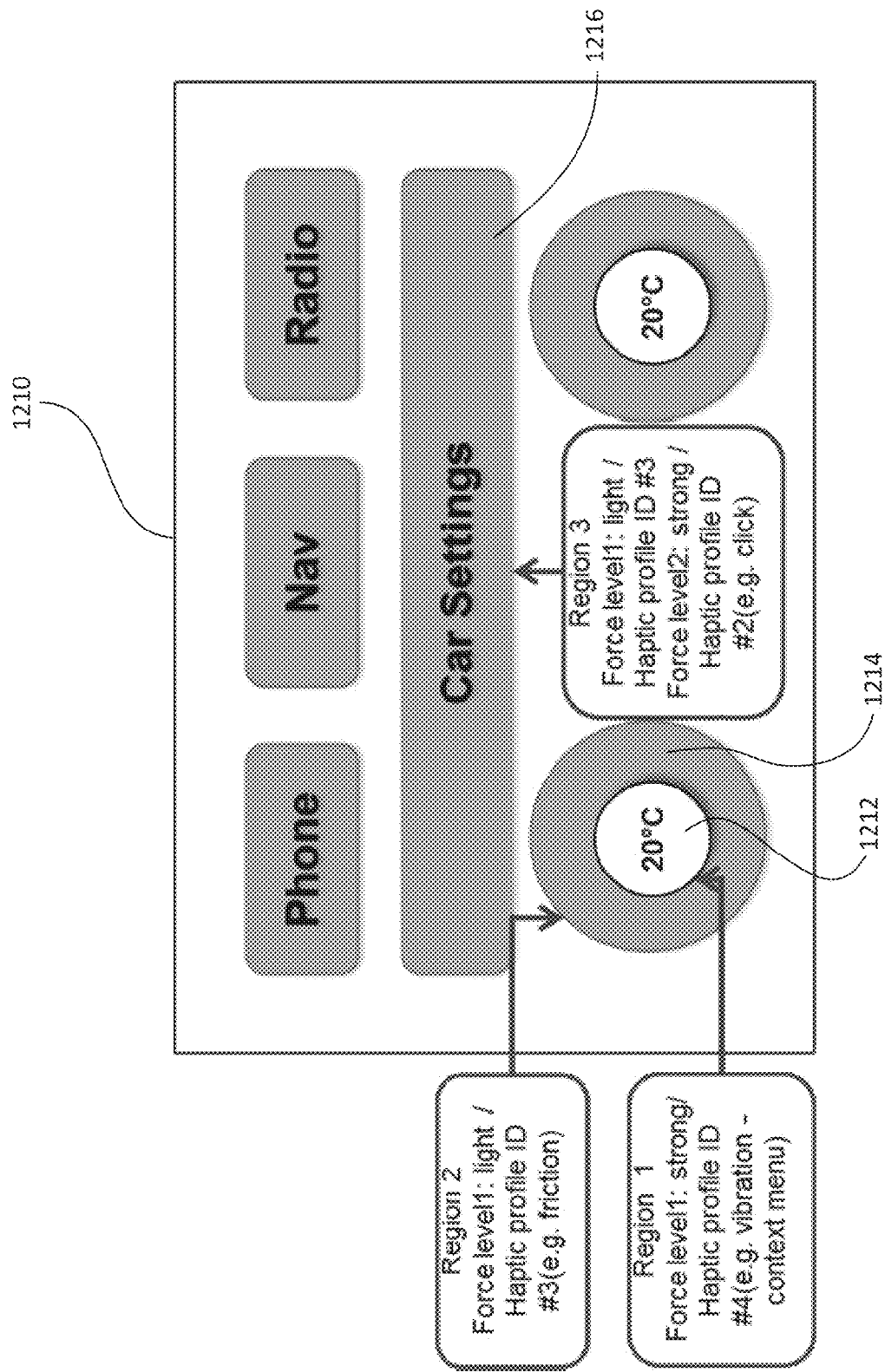
FIG. 12 shows an embodiment of a radio GUI including features and parameters associated with at least some of the UI elements of the radio GUI.

FIG. 12 illustrates a simplified version of a radio GUI 1210 for an automobile touch control panel. Three regions are specifically called out, Region 1, Region 2, and Region 3. Region 1 is a button 1212 in the middle of a rotary dial 1214 for temperature control. Haptic feedback according to a haptic profile ID #4 (vibration) is provided responsive to a touch event having a strong force level. Region 2 is the rotary dial 1214, also for temperature control. Haptic feedback according to a haptic profile ID #3 (friction) is provided responsive to a touch event having a light force level. Finally, Region 3 is a button 1216 to bring up a menu for car settings. Haptic feedback according to haptic profile ID #2 (click) is provided responsive to a touch event having a strong force level, and haptic feedback according to haptic profile ID #3 (friction) is provided responsive to a touch even having a light force level.

Figure 13:
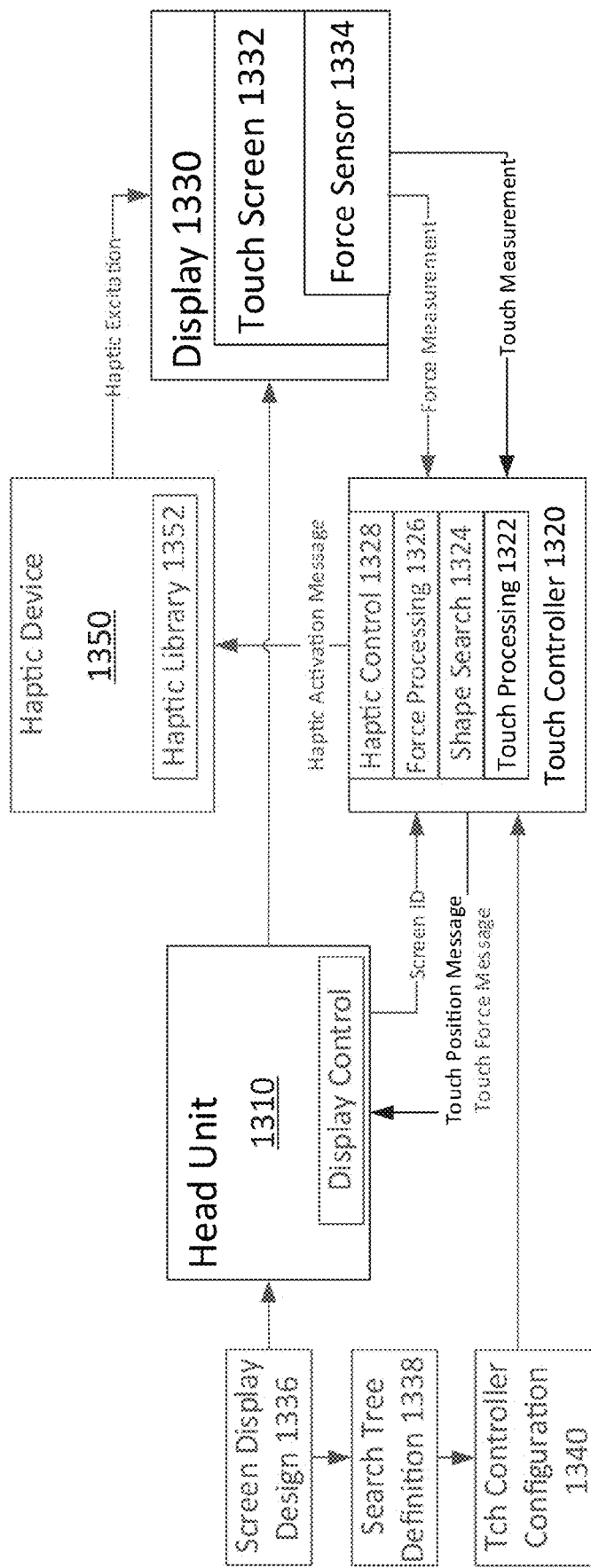
FIG. 13 illustrates an embodiment of the system of FIG. 11 incorporated into a head unit of an automobile as a sub-system.

FIG. 13 illustrates the system of FIG. 11 and GUI of FIG. 12 incorporated into automotive controls commanded by a head unit 1310, and haptic effects in the head unit 1310 are controlled by a microcontroller. In this embodiment, the touch controller 1320 and shape search functions 1324 are part of an automotive sub-system where an automotive head unit 1310 responds to touches with haptic feedback without direct intervention of the head unit 1310 processing circuitry. The touch controller 1320 is configured to identify touched screen buttons from the touch positions and force level information and run a touch state machine including a button position to trigger the haptic effect.

In this embodiment, the force processing 1326 and touch processing 1322 are integrated into one touch controller 1320, and the head unit 1310 contains the definitions (screen display design 1336, search tree definitions 1338, and touch controller configuration 1340) of a number of geometric object descriptions each required to elicit a range of haptic effects to be directly activated by the touch controller 1320 and performed by the haptic device 1350.

For example, after a touch at the display 1330 (which includes a touch sensor 1332 and a force sensor 1334), the touch controller 1320 receives force information and touch information from force processing 1326 and touch processing 1322. The information may include a force measurement and a touch position on the display. The shape search 1324 provides UI element information corresponding to the UI element, if any, displayed at the display 1330 where the touch occurred. If there is no UI element that corresponds to the location on the display, the shape search 1324 provides a null search result. While searching for a UI element's shape information, the shape search 1324 may use the definitions stored at the head unit 1310. In one embodiment, the shape search 1324 may receive the definitions during a provisioning process, for example, when the touch controller 1320 is integrated with the head unit 1310, or when the head unit 1310 is powered on. If the shape search 1324 identifies a UI element, the haptic information is used by the haptic control 1328 to send a haptic activation message to the haptic device 1350 that includes a haptic effect and a position for the haptic effect. The haptic activation message may include a parameter indicative of the level of haptic effect (e.g., weak, medium, strong). The haptic device 1350 searches for the haptic effect definition in the haptic library 1352 stored at the haptic device. The haptic device 1350 then controls actuators at the display 1330 so that the specific area of the display exhibits the requested haptic effect. Notably, different haptic devices may have different haptic libraries so the effects may be different between devices.

In this embodiment, the GUI definition is an XAML file, which is an xml implementation for graphical user interfaces. The XAML file contains a hierarchical structured list of drawing instructions for the screen elements of the UIs of the GUI. In the XAML file there are tags associated with GUI elements. For example, "Width," "Height," and "Horizontal Alignment" are all valid tags for particular elements.

Many of the functional units described in this specification may be illustrated, described or labeled as modules, threads, or other segregations of programming code, in order to more particularly emphasize their implementation independence. Modules may be at least partially implemented in hardware, in one form or another. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented using software or firmware, stored on a physical storage device (e.g., a computer readable storage medium), in memory, or a combination thereof for execution by various types of processors.

An identified module of executable code may, for instance, comprise one or more physical or logical blocks of computer instructions, which may, for instance, be organized as a thread, object, procedure, or function. Nevertheless, the executable of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several storage or memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more physical devices, which are referred to herein as computer readable media.

In some embodiments, the software portions are stored in a non-transitory state such that the software portions, or representations thereof, persist in the same physical location for a period of time. Additionally, in some embodiments, the software portions are stored on one or more non-transitory storage devices, which include hardware elements capable of storing non-transitory states and/or signals representative of the software portions, even though other portions of the non-transitory storage devices may be capable of altering and/or transmitting the signals. Examples of non-transitory storage devices are flash memory and random-access-memory (RAM). Another example of a non-transitory storage device includes a read-only memory (ROM) which can store signals and/or states representative of the software portions for a period of time. However, the ability to store the signals and/or states is not diminished by further functionality of transmitting signals that are the same as or representative of the stored signals and/or states. For example, a processor may access the ROM to obtain signals that are representative of the stored signals and/or states in order to execute the corresponding software instructions.

On a practical level the software that enables a computer system to perform the operations described herein, may be supplied on any one of a variety of media. Further, the actual implementation of the approach and operations of the invention are actually statements written in a computer language. Such computer language statements, when executed by a computer, cause the computer to act in accordance with the particular content of the statements. Further, the software that enables a computer system to act in accordance with the invention may be provided in any number of forms including, but not limited to, original source code, assembly code, object code, machine language, compressed or encrypted versions of the foregoing, and any and all equivalents.

One of ordinary skill in the art will appreciate that "media," or "computer-readable media," as used here, may include a diskette, a tape, a compact disc, an integrated circuit, a ROM, a CD, DVD, BLU-RAY®, a cartridge, flash memory, a memory stick or card, or any other non-destructive storage medium usable by computers, including those now known or hereafter developed.

Although the enabling software might be "written on" a disc, "embodied in" an integrated circuit, "carried over" a communications circuit, "stored in" a memory chip, or "loaded in" a cache memory, it will be appreciated that, for the purposes of this application, the software will be referred to simply as being "in" or "on" the computer readable medium. Thus, the terms "in" or "on" are intended to encompass the above mentioned and all equivalent and possible ways in which software can be associated with a computer readable medium.

For the sake of simplicity, therefore, the term "computer program product" is thus used to refer to a computer readable medium, as defined above, which has on it any form of software to enable a computer system to operate according to any embodiment of the invention.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventors.

What is claimed:

1. An apparatus, comprising:
   a touch screen to display a graphical user interface (GUI);
   a single processor; and
   a non-transitory storage medium to store one or more search tasks ordered in a list and executable via the single processor to:
   generate a list of search tasks concatenated in memory in sequential physical memory addresses to form a conditioned search task list;
   determine a location of a sensed touch at a touch screen;
   identify an element of a graphical user interface (GUI) presented at the touch screen that is associated with the determined location of the sensed touch according to a sequential execution of the search tasks of the conditioned search task list on the non-transitory storage medium responsive to the determined location; and
   provide a user feedback response that corresponds to the identified element of the GUI.

2. The apparatus of claim 1, wherein the one or more search tasks enable the processor to identify a user-feedback response responsive to the identified element of the GUI.

3. The apparatus of claim 2, wherein the one or more search tasks further enable the processor to create one or more control signals responsive to the user-feedback response associated with the identified element of the GUI.

4. The apparatus of claim 3, wherein the user-feedback response is a haptic response.

5. The apparatus of claim 4, wherein the one or more control signals control a haptic driver to excite one or more actuators in the touch screen.

6. The apparatus of claim 5, further comprising determining a force level associated with the touch and wherein the processor creates the one or more control signals responsive to the force level.

7. The apparatus of claim 1 wherein the user feedback response instructs a haptic driver to excite one or more actuators in a touch screen responsive to the user feedback response.

8. A method, comprising:
   generating a list of search tasks concatenated in memory in sequential physical memory addresses to form a conditioned search task list;
   determining a location of a sensed touch at a touch screen;
   sequentially executing one or more search tasks of the conditioned search task list responsive to the determined location, wherein each search task of the conditioned search task list corresponds to a different element of a graphical user interface (GUI), and, when executed, returns a search result; and
   identifying an element of the GUI responsive to the search result; and
   provide a user feedback response that corresponds to the identified element of the GUI.

9. The method of claim 8, further comprising identifying a user-feedback response responsive to the identified element of the GUI.

10. The method of claim 9, further comprising creating one or more control signals responsive to the user-feedback response associated with the identified element of the GUI.

11. The method of claim 10, wherein the user-feedback response is a haptic response.

12. The method of claim 11, wherein the one or more control signals control a haptic driver to excite one or more actuators in the touch screen.

13. The method of claim 12, further comprising determining a force level associated with the touch and wherein a processor creates the one or more control signals responsive to the force level.

14. The method of claim 8, wherein each search task includes a payload that is inserted responsive to a search tree.

15. A system, comprising:
    a display controller;
    a touch controller to:
    generate a list of one or more search tasks concatenated in memory in sequential physical memory addresses to form a conditioned search task list;
    determine a location of a sensed touch at a touch sensor;
    sequentially execute one or more search tasks of the conditioned search task list responsive to the determined location, wherein a respective search task of the conditioned search task list corresponds to a different element of a graphical user interface (GUI), and, when executed, the respective search instruction returns a search result;
    identify an element of the GUI responsive to the search result; and
    provide a user feedback response that corresponds to the identified element of the GUI.

16. The system of claim 15, further comprising a haptic feedback sub-system that generates haptic feedback at the display.

17. The system of claim 15, wherein some of the one or more search tasks comprise a jump instruction associated with another search task of the one or more search tasks, that, when executed, loads the other search task.

18. The system of claim 17, wherein the jump instructions enable the one or more search tasks to be executed in a tree-like order.

19. The system of claim 15, further comprising an automotive head unit.

* * * * *